United States Patent [19]

Kohlhaupt et al.

[11] Patent Number: 5,116,996
[45] Date of Patent: May 26, 1992

[54] PURIFICATION OF INDIGO

[75] Inventors: Reinhold Kohlhaupt, Frankenthal; Walter Bieg, Gruenstadt; Ernst Lang, Bad Durkheim, all of Fed. Rep. of Germany

[73] Assignee: BASF Aktiengesellschaft, Ludwigshafen, Fed. Rep. of Germany

[21] Appl. No.: 731,657

[22] Filed: Jul. 17, 1991

[51] Int. Cl.$^5$ .............................................. C09B 7/00
[52] U.S. Cl. .................................... 548/457; 548/458
[58] Field of Search ......................................... 548/457

[56] References Cited

FOREIGN PATENT DOCUMENTS 0335524 10/1989 European Pat. Off. ............ 548/457
0124027  9/1979 Japan ................................... 548/457

Primary Examiner—David B. Springer
Attorney, Agent, or Firm—Oblon, Spivak, McClelland, Maier & Neustadt

[57] ABSTRACT

A process for purifying indigo comprises stripping the as-synthesized aqueous alkaline indoxylate solution before its oxidation to indigo of impurities in the absence of oxygen by distillation or by passing in steam or an inert gas and then treating the indigo precipitated on oxidation of the stripped indoxylate solution with dilute hydrogen peroxide solution.

8 Claims, No Drawings

PURIFICATION OF INDIGO

Indigo, by volume the worldwide most important synthetic textile dye, still contains impurities, for example up to 0.6% by weight of aniline and 0.4% by weight of N-methylaniline, despite a mature production technology. There are other compounds it contains in even smaller amounts, but which should ideally be removed.

It is an object of the present invention to develop an effective and economical process for purifying indigo whereby the dye is obtained free or at least very substantially free of aromatic amines and other impurities.

Attempts to remove the aromatic amines present in the indigo by known purification techniques, for example by washing or by stirring up with dilute acids, by steam distillation or by extraction with organic solvents, have hitherto not been successful, not even with very finely ground dye.

Since these purification techniques do not achieve any reduction in the levels of aniline and N-methylaniline, even after intensive grinding of the dye, these impurities are probably firmly occluded within the indigo crystal structure.

In all known industrial processes for preparing indigo, this dye is obtained in a last synthesis step from an aqueous alkaline indoxylate solution by air oxidation.

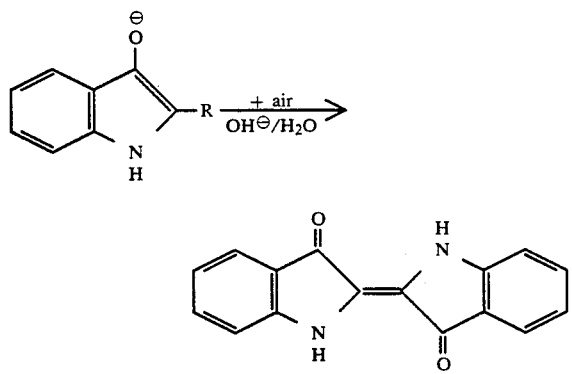

R = H, COO⁻

We have found that the abovementioned object is achieved and that very substantially purified indigo is obtained in good yield when the aromatic amines in the as-synthesized aqueous alkaline indoxylate solution before it is oxidized into indigo are removed therefrom by means of steam or an inert gas and the indigo then obtained in a conventional manner by oxidation of the stripped indoxylate solution is subjected to a hydrogen peroxide treatment.

The inert gas used is for example a noble gas or preferably nitrogen.

Even without prior removal of aniline by stripping the indoxylate solution it is possible to destroy other impurities of technical grade indigo by treatment with hydrogen peroxide.

To ensure quantitative removal of the impurities from the indoxylate solution, it is very important to carry out the stripping in the strict absence of oxygen, which is advantageously achieved by working under nitrogen.

This is because even minimal amounts of oxygen react with the dissolved indoxylate to form indigo, which then irreversibly occludes for example aniline and N-methylaniline.

To avoid the well known and undesirable formation of indoxyl red(I) due to the self-condensation of indoxylate, the stripping is advantageously carried out at from 55° to 80° C., preferably at from 65° to 75° C.

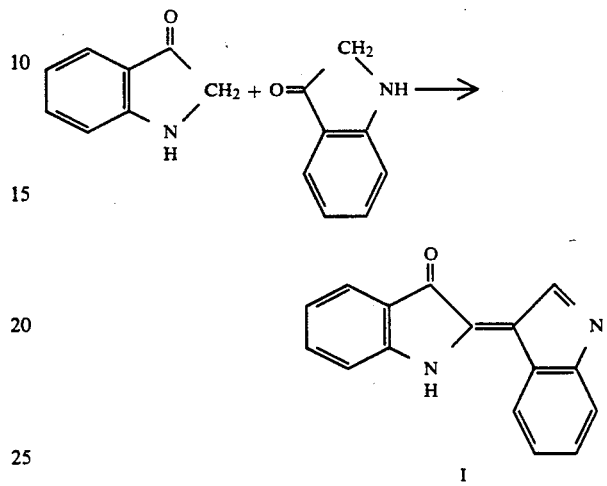

I

Optimum steam stripping of the impurities present in the indoxylate solution is achieved by distilling off from 5 to 30% by weight, preferably 10% by weight, of the water present in the indoxylate solution at a pressure of from 150 to 450 mbar, preferably from 250 to 350 mbar, corresponding to a preferred stripping temperature of from 65° to 75° C., for which the thermal energy required is supplied either from the outside by heating or by introducing steam into the indoxylate solution for from 0.5 to 5 hours, preferably from 1 to 2 hours.

Optimum inert gas stripping of the indoxylate solution to deplete the aromatic amines is achieved by passing through the indoxylate solution at from 55° to 80° C., preferably at from 65° to 75° C., from 40 to 120 l, preferably from 60 to 80 l, of inert gas per l per hour, the stripping taking from 0.5 to 5 hours, preferably from 1 to 2 hours.

The indigo obtained by oxidation following the stripping of the indoxylate solution can be treated at from 0° to 90° C., preferably at from 20° to 50° C., with a from 0.1 to 10, preferably 3, % strength by weight hydrogen peroxide solution which contains sulfuric acid in a concentration of from 1 to 10, preferably 5, % by weight.

In an advantageous form of the process of the invention, which can be carried out batchwise or continuously, the as-synthesized, hot, aqueous alkaline indoxylate solution at about 85° C. is immediately blanketed with nitrogen, very quickly (within approximately 5–15 minutes) cooled down to 65°–75° C. and then stripped at that temperature either by distillation or by passing in steam or inert gas.

The indigo then obtained by oxidation of the stripped indoxylate solution can be washed with the aqueous hydrogen peroxide solution after filtration, for example on a suction filter.

After the indigo has been washed neutral with water and dried, its purity is a 96% (measured photometrically) and its aniline and N-methylaniline levels are down to 0.001–0.06% and 0–0.01% respectively.

The following Examples will further illustrate the process:

EXAMPLE 1

A stirred glass reactor with a stillhead is charged with 1000 g of an approximately 4% strength by weight aqueous alkaline indoxylate solution. 100 g of water are distilled out of the oil bath heated indoxylate solution in an hour at 65° C./250 mbar with stirring. After the vacuum has been released, the indoxylate solution is oxidized in a conventional manner with air at 65°-75° C. The indigo obtained in an amount of 39.5 g (calculated dry) is filtered on a suction filter and washed almost neutral with water. The dye is then washed with 1000 g of an aqueous 20°-25° C. solution containing 5% by weight of sulfuric acid and 3% by weight of hydrogen peroxide. The purified indigo is then dried. It is 96.5% pure and has an aniline content of 0.02% and an N-methylaniline content of 0–0.002%.

EXAMPLE 2

A 2 l stirred glass reactor with a stillhead is charged with 1000 g of an approximately 4% strength by weight aqueous alkaline indoxylate solution. 100 g of steam are passed into the indoxylate solution with stirring at 70° C./300 mbar in the course of an hour, during which about 95 g of water are distilled off. After the vacuum has been released, the indoxylate solution is oxidized in a conventional manner with air to 70°-75° C. The rest of the procedure is as described in Example 1. The purity of the dried dye is 96.0%. 0.02% of aniline and 0–0.002% of N-methylaniline are still left in the indigo.

EXAMPLE 3

A 2 l stirred glass reactor with a stillhead and oil bath heating is charged with 1000 g of an approximately 4% strength by weight aqueous alkaline indoxylate solution. 160 l of nitrogen are passed with stirring through the indoxylate solution at 80° C. in the course of 2 hours, during which about 75 g of water are distilled off. After the vacuum has been released, the indoxylate solution is air oxidized in a conventional manner at 80°-85° C. The rest of the procedure is as described in Example 1. The purity of the dried dye is 96.0%. 0.03% of aniline and 0–0.002% of N-methylaniline are still left in the indigo.

EXAMPLE 4

A distillation column with fabric packing in the stripper portion (packing height = 1 m) is fed at a top column pressure of 250 mbar with an approximately 4% strength by weight aqueous alkaline indoxylate solution at 65° C. at a rate of 15 kg/h. 1.5 kg of steam per hour are passed through the indoxylate solution in countercurrent. The steam-stripped indoxylate solution leaving at the base of the column is air oxidized in a conventional manner at 65°-70° C. The indigo obtained on oxidation of 1 kg of indoxylate solution is filtered on a suction filter. The rest of the procedure is as described in Example 1. The purity of the finally dried dye is 96.0-97.0%. The indigo contains 0.01% of aniline and 0–0.001% of N-methylaniline.

We claim:

1. A process for preparing purified indigo, which comprises stripping the as-synthesized aqueous alkaline indoxylate solution before its oxidation to indigo of impurities in the absence of oxygen by distillation or by passing in steam or an inert gas and then treating the indigo precipitated on oxidation of the stripped indoxylate solution with dilute hydrogen peroxide solution.

2. A process as claimed in claim 1, wherein the stripping of the indoxylate solution is effected by distillation or by passing in steam or an inert gas at from 55° to 80° C., preferably at from 65° to 75° C.

3. A process as claimed in claim 1, wherein the stripping of the indoxylate solution is effected by distillation or by passing in steam at a pressure of from 150 to 450 mbar, preferably from 250 to 350 mbar.

4. A process as claimed in claim 1, wherein from 5 to 30% by weight, preferably 10% by weight, of the water present in the indoxylate solution is distilled off in the course of the stripping.

5. A process as claimed in claim 1, wherein, if the stripping of the indoxylate solution is to be effected by passing in an inert gas, from 40 to 120, preferably from 60 to 80, parts by volume of inert gas are passed in per part by volume of indoxylate solution.

6. A process as claimed in claim 1, wherein the stripping of the indoxylate solution is effected in the course of from 0.5 to 5 hours, preferably in the course of from 1 to 2 hours.

7. A process as claimed in claim 1, wherein the dye obtained on stripping and oxidizing the indoxylate solution is treated in the weight ratio of from 1:10 to 1:40, preferably from 1:15 to 1:35, with a from 0.1 to 10% strength by weight, preferably 3% strength by weight, hydrogen peroxide solution which has been acidified with aqueous sulfuric acid.

8. A process as claimed in claim 7, wherein the hydrogen peroxide treatment of indigo is carried out at from 10° to 90° C., preferably at from 20° to 50° C.

* * * * *